May 27, 1958     R. A. DOAK, JR., ET AL     2,836,105
CONTACT TYPE LATCH AND FIRING MECHANISM
FOR ROCKET LAUNCHER
Filed Sept. 1, 1953     2 Sheets-Sheet 1
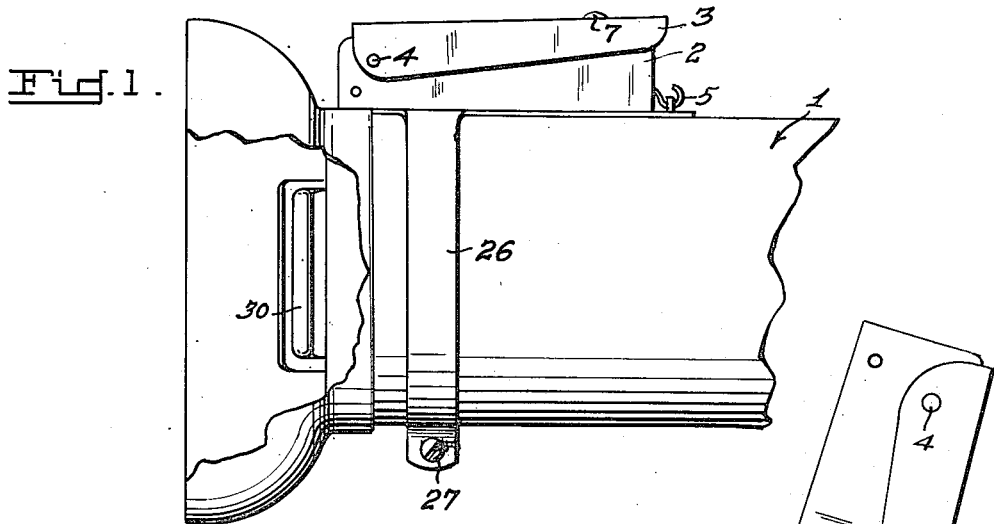
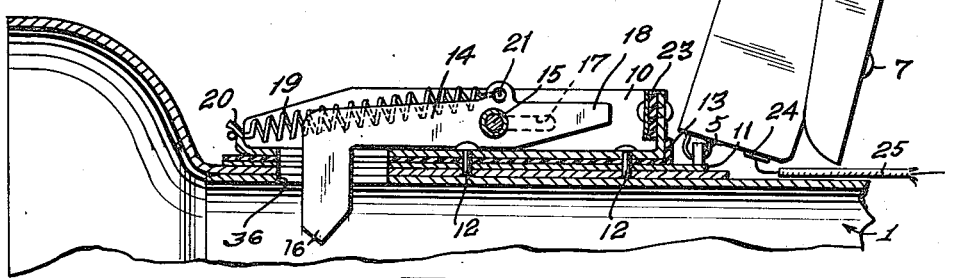
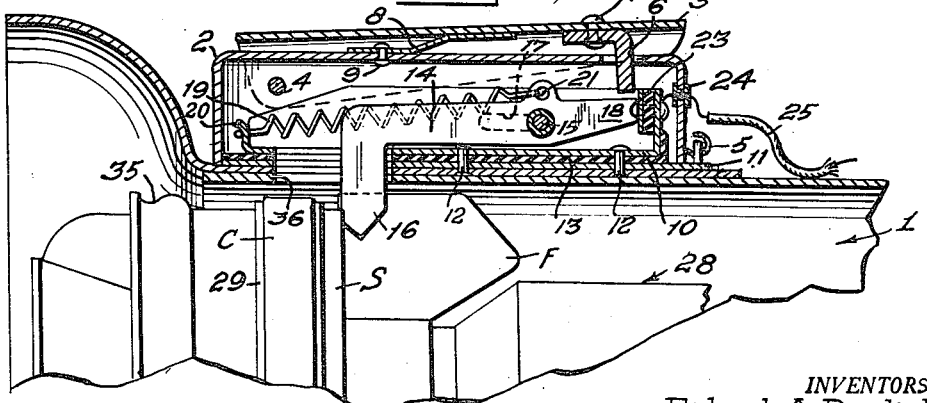
INVENTORS,
Robert A. Doak, Jr.
Luis R. Garza
BY
W. E. Thibodeau, A. W. Dew
and D. P. Smith ATTORNEYS May 27, 1958 R. A. DOAK, JR., ET AL 2,836,105
CONTACT TYPE LATCH AND FIRING MECHANISM
FOR ROCKET LAUNCHER
Filed Sept. 1, 1953 2 Sheets-Sheet 2
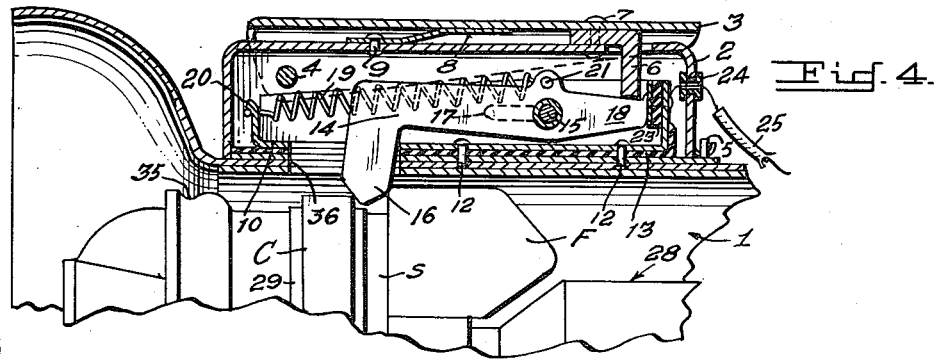
Fig. 4.
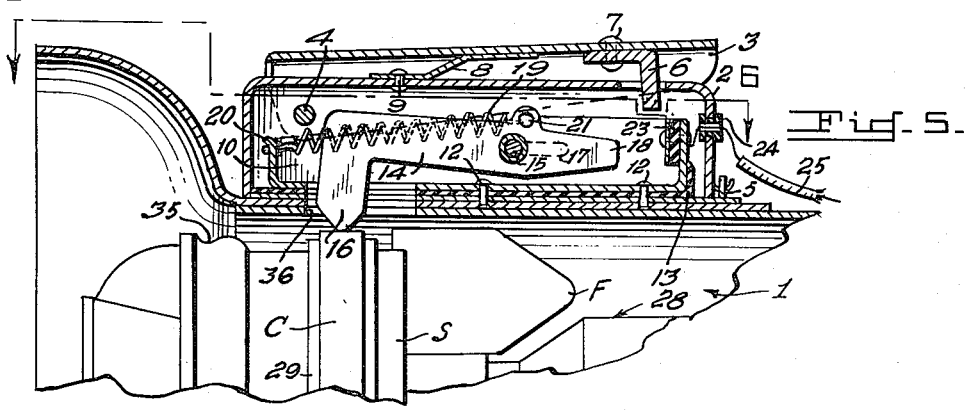
Fig. 5.
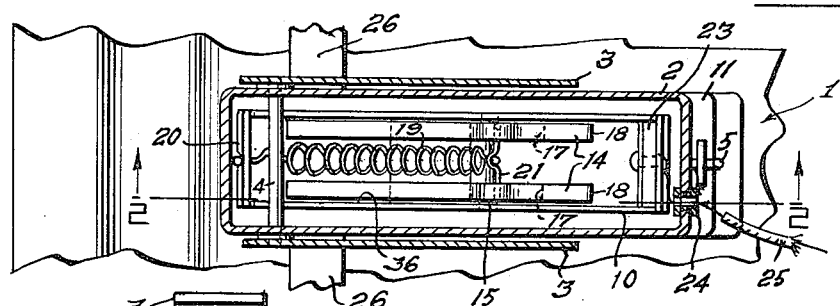
Fig. 6.
Fig. 7.
INVENTORS
Robert A. Doak Jr.
Luis R. Garza
BY
W. E. Thibodeau, A. W. Dew
and D. P. Smith ATTORNEYS.

2,836,105
Patented May 27, 1958

2,836,105

CONTACT TYPE LATCH AND FIRING MECHANISM FOR ROCKET LAUNCHER

Robert A. Doak, Jr., Cromwell, Conn., and Luis R. Garza, San Antonio, Tex., assignors to the United States of America as represented by the Secretary of the Army Application September 1, 1953, Serial No. 385,723

5 Claims. (Cl. 89—1.7)

This invention relates to rockets and launchers therefor and more particularly to a contact type firing mechanism for a single shot rocket launcher of the bazooka type.

The usual method of loading a rocket into the tube for firing involves removing the insulation from a squib lead and attaching the same to a contact pin on the launcher tube housing to complete the circuit from the trigger magneto to the squib. This requires more time than is deemed necessary, and the possibility of error under the stress of battle conditions and inclement weather has made it mandatory to develop a more efficient and positive firing system. The present invention adroitly solves the problem by providing a firing organization that greatly decreases the loading time of a rocket and provides at the same time an additional safety factor.

It is a prime object of our invention therefore to improve on the rocket firing devices now in use.

It is a further and more specific object of our invention to provide a combined stop and firing contactor for use in a rocket launcher.

It is a still further object of our invention to provide a novel organization to function in a two step cycle to hold the rocket in a ready position and then to arm the same.

The specific nature of the invention as well as other objects and advantages thereof will clearly appear from a description of a preferred embodiment as shown in which:

Figure 1 is a side elevation of the invention applied to the breech end of a rocket launcher, part being broken away to illustrate the position of the parts.

Figure 2 is a longitudinal section taken on lines 2—2 of Figure 6 with the housing shown in side elevation and turned upward.

Figure 3 is a view similar to Figure 2 but with the housing shown closed and the rocket locked in the ready position.

Figure 4 is a view similar to Figure 3 but with the rocket about to be released.

Figure 5 is a view similar to Figure 4 but with the rocket armed for firing.

Figure 6 is a sectional view taken along lines 6—6 of Figure 5.

Figure 7 is a rear view of a launcher made in accordance with our invention.

Referring now more particularly to the drawings wherein like reference characters designate corresponding parts throughout the different views:

Reference character 1 indicates generally the breech end of a rocket launcher tube tightly embraced by a divided semi-flexible band 26 held together at the bottom by bolt 27 and broadened at the top to support the contactor and firmly secure the same to the tube. As is perhaps best seen in Figures 2 and 3 housing cover 2 is hinged at its forward end to base 11 by a hook and eye 5 and carries operating lever 3 pivotally mounted thereon by rivet 4. Mounted on the underside of the operating lever is an angle piece 6 secured by rivet 7 to the lever 3. A flat spring 8 is fastened to housing 2 by rivet 9 and urges against the bottom of the operating lever 3, substantially as shown.

The base 11 is formed into an arcuate shape to register with the cylindrical tube and has fastened thereto by rivets 12 a channel plate 10 substantially U-shaped in cross section and provided with an end member carrying a rubber pad 23. An insulating strip 13 is interposed between the bottom of the channel plate 10 and the base 11. The channel plate 10 is provided with a pair of aligned slots 17 in its upright sides providing bearing guides for a pin 15 piercing a pair of bell crank members 14 and separately pivotable thereon as will later be more fully explained. The bell crank members have legs 16 formed integral therewith and passing through an opening 36 in the launcher tube in normally interfering relation with the path of a part of a rocket. A spring 19 urging between an eye 20 and a bell crank saddle 21 normally holds the pin 15 in the extreme rearward corner of the elongated slot. It should be noted that the forward portions 18 of the several bell cranks are disposed under the depending portions of the angle 6 when the bell cranks are moved to the extreme forward corner against the urging of spring 19 and are clear thereof when disposed in the rearward position. The rubber snubber 23 is provided to soften the impact of portions 18 against the end wall in the operation of my device as will later more fully be explained.

A lead 25 from the trigger magneto passes through an insulating bushing 24 in the housing and connects to the end wall of plate 10 whereby the entire assembly above the insulating strip 13 is at a potential higher than the potential of the launcher tube when the trigger is pulled. The internal arrangement of the rocket 28 is such that the squib is connected between the contact ring C and the casing.

Figures 2, 3, 4 and 5 illustrate the step by step operation of loading a rocket by the use of our device. When the rocket is pushed into the tube the shroud ring S engages the legs 16 and carries them forward against the urging of spring 19 to the position illustrated in Figure 3 wherein the pin 15 has advanced to the extreme forward corner of slot 17 and the forward portions 18 of the bell cranks have impacted against the rubber pad 23. This is the ready position. If now the operating lever 3 be depressed by the hand then angle piece 6 will bear against the forward portions of the bell cranks rotating them clockwise about the pivot point and removing the legs 16 from their interfering relation with the shroud as illustrated in Figure 4. As soon as the legs have been raised high enough to clear the shroud the spring 19 compresses the bell cranks rearwardly so that the pin now retreats to the rearward corner of slot 17 and the ends of legs 16 rest upon contact ring C which is insulated from the rocket body by insulator 29. The rocket is now in the armed position. In this condition actuation of the trigger magneto will generate a voltage to force current through lead 25, plate 10, bell crank legs 16, rocket contact ring C through the squib to the rocket casing to fire the same. When the rocket has left the tube the spring forces the legs down into the tube, as in Figure 7, to engage the next rocket.

In Figure 7 the conventional rocket contactor latch assembly which cooperates with groove 35 of a rocket has been illustrated and is denoted by reference character 30 to show its radially rotated location with respect to the latch assembly on the usual rocket launcher.

An additional safety feature of our invention is the radial spacing of the legs 16 so that a rocket fin F cannot raise both of them simultaneously. If for example one leg were raised by the fin the other would still be in the down position, since they rotate independently, to engage the shroud ring and to prevent the arming of the rocket until after positive depression of the operating lever by the user.

It is believed that the many advantages of a launcher tube constructed in accordance with the present invention will be readily understood, and although a preferred embodiment is as illustrated and described, it is to be understood that changes in the details of construction may be resorted to which will fall within the scope of the invention as claimed.

We claim:

1. The combination comprising a hollow tube of the type used as a launcher, a rocket adapted to be loaded through the rear end of said tube and discharged from the front end, a shroud ring on the said rocket, a contact ring on the said rocket, at least two longitudinally movable radially spaced bell cranks pivotally mounted for independent rotation on said tube and extending in part within the same to interfere with the said shroud ring and arrest forward motion of said rocket after a limited forward motion thereof, an operating lever to rotate both said bell cranks simultaneously to remove the said engagement with the said shroud ring, resilient means to urge the said bell cranks rearwardly to engage the said contact ring and a circuit connected to the said bell cranks to arm the said rocket upon the said engagement between the said bell cranks and the said contact ring.

2. The combination comprising a hollow tube of the type used as a launcher, a rocket adapted to be loaded through the rear end of said tube and discharged from the front end, a shroud ring on the said rocket, a contact ring on the said rocket, a pair of radially spaced bell cranks pivotally mounted on said tube for simultaneous translation and individual rotation with respect to the longitudinal axis thereof and extending at one of their ends within the same to interfere with the said shroud ring and arrest forward motion of said rocket after a limited translation thereof, an operating means to depress said pair of bell cranks at the other end to remove the said interference with the said shroud ring, the said bell cranks forming a part of an electrical circuit, and a spring to resiliently urge the said bell cranks rearwardly to engage the said contact ring to arm the rocket.

3. The combination comprising a tube of the type used as a rocket launcher, a rocket adapted to be loaded through the rear end of said tube and discharged from the front end, a plurality of fins on the said rocket, a shroud ring joining the said fins, a contact ring disposed adjacent the said shroud ring, a pair of radially spaced bell cranks pivotally mounted on said tube for simultaneous translation and independent rotation with respect to the longitudinal axis thereof and extending at one end within the same to interfere with the said shroud ring and arrest motion of said rocket after limited motion thereof, a lever to depress said pair of bell cranks simultaneously at the other end to remove the said interference, the said bell cranks forming a part of an electrical circuit, and a spring to resiliently urge the said bell crank rearwardly to engage the said contact ring to arm the rocket.

4. The invention as set forth in claim 3 wherein the radial spacing between the said bell cranks is less than the radial spacing between the said rocket fins.

5. The combination comprising a hollow tube, a rocket adapted to be loaded through the rear end of said tube and discharged from the front end thereof, contact and shroud rings on said rocket, contact firing means for said rocket comprising a base member detachably secured on said tube and being disposed adjacent the rear end thereof, a channel plate secured to and electrically insulated from said base member, and having a pair of aligned slots formed in its sides, a pivot pin slidable in said slots, a pair of bell cranks mounted for individual rotation around said pin, each said bell crank defining at its rearward portion a downwardly extending lug normally passing through aligned openings in said base member, channel plate and tube, spring means normally urging said pin rearwardly in said slots, and biasing said legs downwardly into said tube to interfere with said shroud ring on said rocket in said tube and holding said rocket in an unarmed ready position therein, a housing cover hinged at its forward end to said first channel member, said housing cover adapted to cover said channel plate and complete electrical connection between said bell cranks, said contact ring on said rocket and a source of electrical energy, a spring-biased operating lever pivoted to the upper portion of said housing cover and a downwardly extending lug fixed to the underside of said lever and piercing said housing plate to a length terminating immediately above the forward portions of said bell cranks when said bell cranks have been urged into an extreme forward position by said shroud ring of said rocket upon its movement into said ready position in said tube, said lug acting upon depression of said lever to rotate both said bell cranks simultaneously to raise said legs from interference with said shroud ring and releasing said bell cranks to move toward an extreme rearward position whereby said legs will establish contact with said contact ring and aim said rocket.

References Cited in the file of this patent

UNITED STATES PATENTS

| | | |
|---|---|---|
| 2,448,962 | Ardenne | Sept. 7, 1948 |
| 2,451,522 | Uhl et al. | Oct. 19, 1948 |
| 2,460,929 | Goff | Feb. 8, 1949 |
| 2,645,999 | Bogard | July 21, 1953 |

FOREIGN PATENTS

| | | |
|---|---|---|
| 671,873 | Great Britain | May 14, 1952 |